May 14, 1946. E. VENABLE 2,400,179
FILTER FOR BREATHING APPARATUS
Filed April 3, 1937
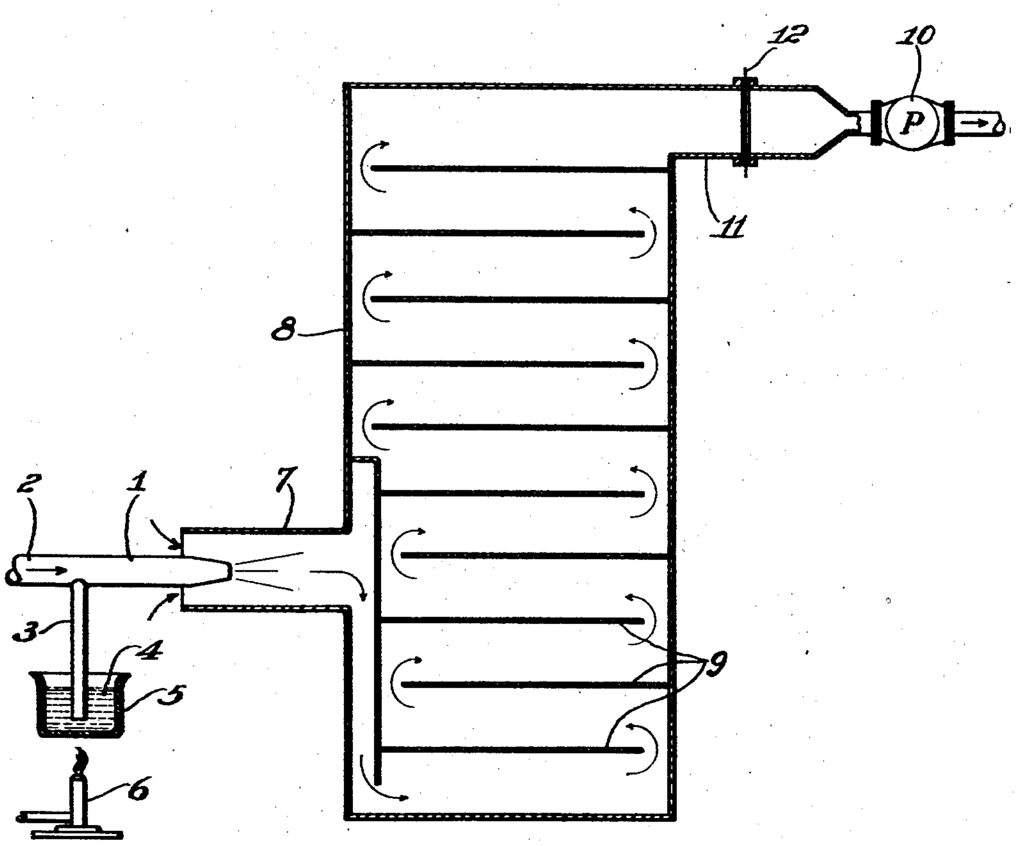
WITNESSES
A.B. Wallace.
Fulton B. Flick.
INVENTOR.
Emerson Venable
BY
Brown, Critchlow & Flick
his ATTORNEYS.

Patented May 14, 1946 2,400,179

UNITED STATES PATENT OFFICE 2,400,179

FILTER FOR BREATHING APPARATUS

Emerson Venable, Wilkinsburg, Pa., assignor to Mine Safety Appliances Company, Pittsburgh, Pa., a corporation of Pennsylvania Application April 3, 1937, Serial No. 134,795

14 Claims. (Cl. 183—44)

This invention relates to filters for the removal of smokes, dusts, and the like dispersoids from air or other gaseous media, and more particularly to filters for such use in breathing apparatus.

The provision of breathing apparatus adapted for removing smokes, dusts and similar objectionable particulate matters dispersed in air, to render it fit for breathing, presents certain difficulties. Ordinarily, the experience in the art has been that if the filter is capable of efficiently removing the dispersoid from air its resistance to breathing is objectionably high. On the other hand, if the filter possesses an unobjectionable breathing resistance, its filtering efficiency will ordinarily be low, i. e., the filter will permit objectionable amounts of the smoke or dust to pass with the air which is breathed. Heretofore difficulties have been encountered in balancing these factors to provide satisfactory filtering efficiency with acceptably low breathing resistance.

Various means have been proposed for providing smoke and dust filters, as, for example, the methods disclosed in U. S. Patent No. 1,798,164 to Harry A. Kuhn and William A. Boyle, No. 1,814,190 to Robert L. Sebastian and Leo Finkelstein, and No. 1,818,155 to Nicholas E. Oglesby and Robert S. Brown. The present invention constitutes an improvement in procedures of the general types disclosed in those patents.

It is among the objects of the invention to provide filters, particularly for use in breathing apparatus, for the removal of smokes, dusts and the like dispersoids from gaseous dispersion media, which possess satisfactory efficiency and breathing resistance, which may be made readily, cheaply and inexpensively, and which possess critical pore size controllable in manufacture according to the conditions of use.

The invention may be described in connection with the accompanying drawing which constitutes a schematic representation of apparatus for use in preparing filters in accordance with the invention.

In accordance with the invention the filter is treated with an air suspension of solid particles of controlled size, and the suspension of such particles is then passed through the filter to deposit particles in its pores. It is a feature of the invention that the pore-engaging particles are solidified from the liquid state prior to being brought into contact with the filter. This manner of forming the filter-impregnating material is productive of particles which are spherical, or substantially so, which confers important advantages, such as the ability to produce filters of desired critical pore size, to control easily the average particle size, and to operate simply and efficiently.

If the pore diameter of a filter be decreased below that size which efficiently removes a dispersoid from air, the breathing resistance will be increased unduly with no increase whatsoever in the efficiency of the filter. Even with the maximum pore size that acts efficiently the breathing resistance may be too high. The resistance may be decreased by increasing the pore size, but thereby the efficiency of the filter is decreased. Critical pore size, as used herein, has reference to the provision of pores having as great a size as is consistent with efficient removal of the smoke or the like without providing objectionably high breathing resistance.

In the practice of the invention there is used a suitable filter base such as any of the felted fibrous materials commonly used for the preparation of filters for these purposes. The special cellulosic filter sheets developed for smoke and dust filters, and well known in the art, are preferred. In accordance with the invention, the particulate suspension is formed from a substance which is solid at all ordinary temperatures but which may be liquefied easily at temperatures not greatly in excess of normal temperatures, and which when liquefied possesses a low viscosity. To insure retention of the material on the filter it should have a relatively low vapor pressure in the solid state, and ordinarily its liquid vapor pressure at the temperatures used should be low also for ease in producing solid particles of desired size. Various materials, organic and inorganic, are known which meet these requirements. Examples of desirable liquefiable materials are the normally solid fatty acids and glycerides, such as stearic acid and normally solid hydrogenated vegetable oils, e. g., hydrogenated cottonseed oil and hydrogenated castor oil. Various other substances may be used, such as normally solid, halogenated organic compounds.

In the preferred practice of the invention the suspension of solid particles is produced by atomization of the liquid impregnating material to form a mist thereof. The mist particles are then solidified prior to being passed into contact with the filter. Most suitably the suspension of solid particles thus formed is treated to remove the large particles therefrom, following which the suspension, in which the particles are largely of average size, is passed into contact with the filter, as by being drawn through the filter by suction.

The spherical particles are deposited in the pores of the filter, between the fibers, and produce an impregnated filter adapted to efficiently remove particulate matter from air.

High efficiency coupled with acceptable breathing resistance results from this impregnation with solid spherical particles.

By control of the size of the mist particles filters of any desired porosity can be provided. That is, the critical pore size can be adjusted in the manufacture of the filter to adapt it to meet any particular condition or combination of conditions. It can be demonstrated mathematically that if $r$ is the average radius of the solid spherical particles which are deposited in the filter pores in accordance with this invention, the maximum dimension between the packed particles, corresponding to the largest needle-shaped particle that can pass, is $0.73r$, while the diameter of the largest spherical particle that can pass through the resultant pores is $0.312r$. By controlling the size of the particles in the mist produced by atomization it is thus possible in accordance with the foregoing relations thus to provide pores adapted efficiently to remove particles of predetermined size while avoiding undue increase in resistance. The control of the size of the mist particles may be achieved by means known in the art, as by regulation of the rate of dilution of the mist with air, by control of the rate of solidification, by controlling the size of the particles produced by the atomizing device, and variation in other factors.

The invention may be explained further with reference to the accompanying drawing showing schematically an apparatus for producing filters in accordance with the invention. It comprises an atomizing device 1 having an inlet 2 for an atomizing fluid, such as air under pressure, and an inlet 3 for drawing liquefied material 4 from a container 5 which may be heated in any suitable manner to maintain its contents liquid, as by a gas burner 6. The liquid material is of the type described hereinabove. The atomized mist of liquid particles is projected into a conduit 7 which opens into a settling chamber 8 provided with a plurality of superimposed shelves 9 so arranged that the gas must change direction repeatedly in traversing the settling chamber. The number of shelves and the rate of flow are varied so that particles above a given size are deposited on the shelves, thus producing a suspension of particles of controlled size, and largely of average size also.

The rate of flow through the chamber is controlled by a suction pump 10 connected to chamber 8 through a conduit 11. The filter 12 which is to be treated is interposed in conduit 11, as shown. so that the mist of solid particles drawn from the chamber by the pump is drawn into the filter, thus causing deposition of the solid particles within the pores of the filter. As appears from the drawing, air may be drawn into conduit 7 around the atomizing device, and by controlling the amount of air the rate of solidification and particle size may be controlled, and this may be assisted or be accomplished in other ways.

Actual practice of the invention has shown that filters having satisfactorily low breathing resistance together with high efficiency, i. e., low leakage of smokes and dust past the filter, may be produced in this manner. This has been proved, for example, by treatment of cellulosic filter sheet with stearic acid in the manner just described, and testing the filters against diphenylamine chlorarsine smoke.

In the use of the filters the pore size is controlled, as explained hereinabove, and the filter not only has an efficient screening action due to the factors explained hereinabove, but also the air traversing it must change direction each time it travels the radius of one of the solidified spheres, thus causing it to take a tortuous path which increases the efficiency of the filter.

Various modifications may be made in the practice of the invention. For instance, the filter may be treated with substances such as glycerine prior to impregnating it in accordance with the invention, and means such as air separators, e. g., cyclone separators, may be used to remove particles larger than desired. Again, the suspension may be formed in other ways known in the art, as by thermal or by explosive dispersion.

Also, while the invention has been described with special reference to stearic acid, by way of illustration, it will be understood that other organic agents may be used, such as those mentioned, and others, such, for instance, as the tetrachlornaphthalenes. Inorganic agents may be used also; for instance, mercuric chloroiodide may be used for some purposes. The essential characteristics of all such materials are that they are normally solid and are capable of being liquefied, and most suitably that they have low vapor pressures. Of course, for breathing apparatus use they should also be non-toxic and non-irritating also.

According to the provisions of the patent statutes, I have explained the principle and mode of operation of my invention and have illustrated and described what I now consider to be its best embodiment. However, I desire to have it understood that, within the scope of the appended claims, the invention may be practiced otherwise than as specifically illustrated and described.

I claim:

1. That method of improving the efficiency of a filter for removing smoke, dust and the like from a gaseous medium, comprising providing a suspension of substantially spherical solid particles of a liquefiable substance which is normally solid, and which possesses a relatively low vapor pressure, said suspension comprising largely particles of controlled size, and passing said suspension through said filter to deposit said particles in its pores.

2. That method of improving the efficiency of a filter for removing smoke, dust and the like from a gaseous medium, comprising providing a suspension of substantially spherical solid particles of a liquefiable substance which is normally solid and which possesses a relatively low vapor pressure, said particles being largely of controlled size to cooperate with the filter to provide critical pore size, and passing said suspension through said filter to deposit said particles in its pores.

3. That method of improving the efficiency of a filter for removing smoke, dust and the like from a gaseous medium, comprising treating a normally solid liquefiable material having a low vapor pressure to produce a suspension comprising largely substantially spherical solid particles of controlled size, said size being such as to cooperate with the filter to provide critical pore size, and passing said suspension through said filter to deposit said particles in its pores.

4. That method of improving the efficiency of a filter for removing smoke, dust and the like from a gaseous medium, comprising the steps of melting a substance which is normally solid and which possesses a relatively low vapor pressure, atomizing the liquid to form a mist of droplets thereof, solidifying the droplets in said mist to form a suspension of solid particles, and passing said suspension into contact with said filter and thereby depositing said solid particles in pores of the filter.

5. That method of improving the efficiency of a filter for removing smoke, dust and the like from a gaseous medium, comprising the steps of melting a substance which is normally solid and possesses a relatively low vapor pressure, atomizing the liquid to form a mist of droplets thereof, solidifying the droplets in said mist and removing large particles to provide a suspension of solidified substantially spherical particles of controlled size, and passing said suspension into contact with said filter and thereby depositing particles in pores of the filter.

6. That method of improving the efficiency of a filter for removing smoke, dust and the like from a gaseous medium, comprising the steps of melting a substance which is normally solid and which possesses a relatively low vapor pressure, atomizing the liquid to form a mist of droplets thereof, solidifying the droplets in said mist and removing large particles to provide a suspension of solidified substantially spherical particles of controlled size productive of critical pore size, and passing said suspension into contact with said filter and thereby depositing particles in pores of the filter.

7. That method of improving the efficiency of a filter for removing smoke, dust and the like from a gaseous medium, comprising the steps of melting a normally solid substance of the group consisting of fatty acids and glycerides, atomizing the liquid to form a mist of droplets thereof, solidifying the droplets in said mist, removing large particles from the suspension of solidified particles thus formed, and passing said suspension into contact with said filter and thereby depositing particles in pores of the filter.

8. A method according to claim 7, said substance being stearic acid.

9. A method according to claim 7, said substance being hydrogenated vegetable oil.

10. That method of improving the efficiency of a filter for removing smoke, dust and the like from a gaseous medium, comprising the steps of melting a normally solid substance of the group consisting of fatty acids and glycerides, atomizing the liquid to form a mist of droplets thereof, solidifying the droplets in said mist and removing large particles to provide a suspension of solidified substantially spherical particles of controlled size productive of critical pore size, and passing said suspension into contact with said filter and thereby depositing particles in pores of the filter.

11. A method according to claim 10, said substance being stearic acid.

12. A method according to claim 10, said substance being hydrogenated vegetable oil.

13. As a new article of manufacture, a filter for breathing apparatus, the filter having pores of critical size for removing smoke, dust, and the like from a gaseous medium, said filter comprising at least one layer of felted fibrous filtering material having deposited in the pores between the fibers solid substantially spherical particles of a normally solid liquefiable material having relatively low vapor pressure, said particles being of controlled size and having low resistance to passage of said gaseous media.

14. As a new article of manufacture, a filter for breathing apparatus, the filter having pores of critical size for removing smoke, dust, and the like from a gaseous medium, said filter comprising at least one layer of felted fibrous filtering material having deposited in the pores between the fibers solid substantially spherical particles of a substance of the group consisting of normally solid fatty acids and glycerides, and having low resistance to passage of said gaseous medium.

EMERSON VENABLE.